United States Patent
Okada

[11] Patent Number: 5,916,056
[45] Date of Patent: Jun. 29, 1999

[54] SPLINED RING GEAR HAVING A THICKER RADIAL PORTION AT ONE AXIAL PORTION OF THE RING GEAR

[75] Inventor: Takashi Okada, Fuji, Japan

[73] Assignee: Jatco Corporation, Japan

[21] Appl. No.: 09/021,351

[22] Filed: Feb. 10, 1998

[30] Foreign Application Priority Data

Feb. 26, 1997 [JP] Japan ................................. 9-058437

[51] Int. Cl.[6] .............................. F16H 3/44; F16H 15/00
[52] U.S. Cl. ............................................ 475/331; 475/344
[58] Field of Search ................................... 475/317, 318, 475/319, 320, 330, 331, 344

[56] References Cited

U.S. PATENT DOCUMENTS 5,267,917  12/1993  Kadotani et al. ................... 475/318 X
5,676,617  10/1997  Tabata et al. ...................... 475/330 X
5,792,020   8/1998  Kikuchi et al. .................... 475/331 X

*Primary Examiner*—Khoi Q. Ta
*Attorney, Agent, or Firm*—Rossi & Associates

[57] ABSTRACT

In a planetary gear device of an automatic transmission, including a sun gear, a plurality of pinion gears that engage with the sun gear, a carrier that rotatably supports the pinion gears, a ring gear having inner teeth formed on an inner periphery thereof for engagement with the pinion gears, a spline is formed on an outer periphery of the ring gear over a first portion that extends from one axial end of the ring gear to a given point between the one axial end and the other axial end, such that only the first portion of the spline engages with friction plates of a clutch. The ring gear further has a second portion that extends from the given point to the other axial end, which second portion has a larger thickness that the first portion of the ring gear that extends from the above-indicated one axial end to the given point.

3 Claims, 3 Drawing Sheets

SPLINED RING GEAR HAVING A THICKER RADIAL PORTION AT ONE AXIAL PORTION OF THE RING GEAR

BACKGROUND OF THE INVENTION

1. Field of the Invention

The present invention relates to a planetary gear device of an automatic transmission used in a motor vehicle, for example.

2. Description of Prior Art

A known example of the planetary gear device of the automatic transmission is disclosed in Laid-open Publication No. 2-50550 of Japanese Utility Model Application. The known planetary gear device of the automatic transmission includes a sun gear, a plurality of pinion gears that engage with the sun gear, a carrier that rotatably supports the pinion gears, and a ring gear having inner teeth formed on the inner periphery thereof for engagement with the pinion gears. A spline is formed on the outer periphery of the ring gear such that the spline engages with drive-side friction plates (drive plates) of a clutch.

In the known planetary gear device as described above, however, the spline is formed over the entire width of the outer periphery of the ring gear, and therefore the smallest thickness or root diameter of the ring gear is reduced, resulting in a reduced strength of the ring gear.

The strength of the ring gear may be increased by increasing the thickness of the ring gear (namely, by increasing the root diameter of the spline formed on the outer periphery of the ring gear). If the root diameter is increased without changing the outside diameter of the spline, however, contact areas between the friction plates of the clutch and the spline engaging with these plates are reduced, resulting in an increased bearing pressure or stresses on the friction plates and the spline.

SUMMARY OF THE INVENTION

It is therefore an object of the present invention to provide a planetary gear device of an automatic transmission wherein a ring gear is given an increased strength without causing an increase in the bearing pressure or stresses on friction plates of a clutch and engaging faces of a spline formed on the outer periphery of the ring gear.

The above object may be accomplished according to the principle of the present invention, which provides a planetary gear device of an automatic transmission, comprising a sun gear, a plurality of pinion gears that engage with the sun gear, a carrier that rotatably supports the pinion gears, a ring gear having inner teeth formed on an inner periphery thereof such that the inner teeth engage with the pinion gears, wherein a spline is formed on an outer periphery of the ring gear over a first portion thereof that extends from one axial end of the ring gear to a point between the one axial end and the other axial end, namely, a point on the way from the one axial end to the other axial end, such that the first range of the spline engages with friction plates of a clutch, and wherein a second portion of the ring gear that extends from the above-indicated point to the other axial end has a larger thickness than the first portion of the ring gear that extends from the one axial end to the above-indicated point between the axially opposite ends.

Preferably, the thickness of the second portion of the ring gear that extends from the above point to the other axial end is gradually increased toward the other axial end.

Further, the ring gear is desirably provided at the above-indicated one axial end thereof with a hub portion.

In the planetary gear device constructed according to the present invention, the spline is formed on the outer periphery of the ring gear over the first portion that extends from one axial end of the ring gear to a point between the above-indicated one axial end and the other axial end, namely, a point on the way from the one axial end to the other axial end, such that only the first portion of the spline engages with friction plates of a clutch, and the second portion of the ring gear that extends from the above point to the other axial end has a larger thickness than the first portion of the ring gear that extends from the one axial end to the above-indicated point. In this arrangement, the strength of the ring gear may be increased without increasing the outside diameter of the ring gear (i.e., the outside diameter of the spline formed on its outer periphery).

If the thickness of the second portion of the ring gear that extends from the above point to the other axial end is gradually increased toward the other axial end, reduced strains arise in the ring gear during heat treatment in the production process, and thus the inner teeth of the ring gear can be formed with high accuracy.

If the ring gear is provided at one axial end thereof with a hub portion, one end portion of the ring gear corresponding to this axial end has an improved rigidity due to the presence of the hub portion, and the other end portion of the gear also has a high rigidity due to the relatively large thickness thereof. Thus, the rigidity of the ring gear is made almost uniform in the axial direction, and the ring gear is less likely to be influenced by strains that would otherwise arise due to the centrifugal force during high-speed rotation, assuring improved tooth bearing and reduced gear noises.

BRIEF DESCRIPTION OF THE DRAWINGS

The invention will be described in greater detail with reference to preferred embodiments thereof and the accompanying drawings, wherein.

DETAILED DESCRIPTION OF THE PREFERRED EMBODIMENTS

Some embodiments of the present invention will be now described in detail.

Figure 1:
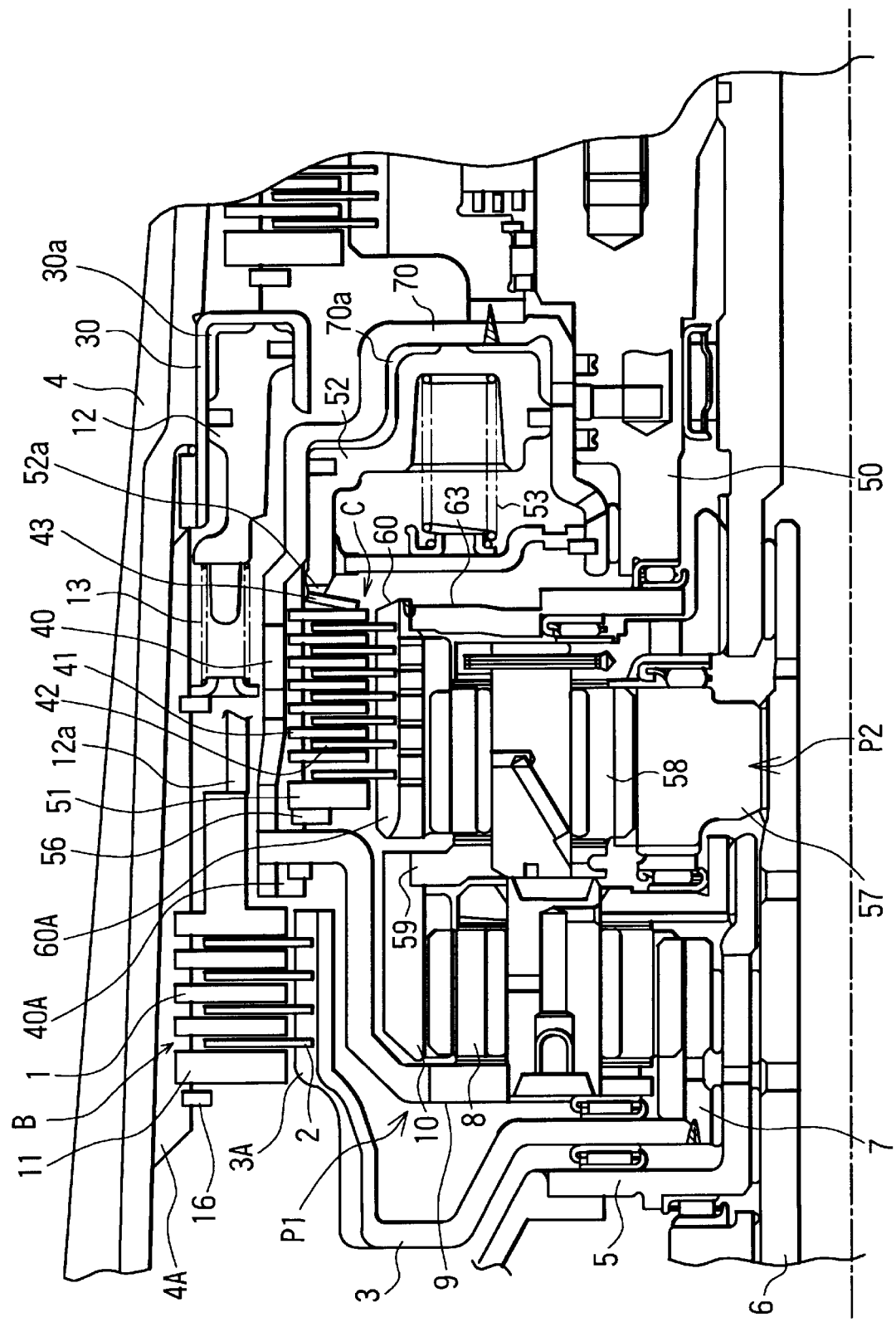
FIG. 1 is a vertical cross sectional view showing planetary gear sets of an automatic transmission according to one embodiment of the present invention.
Figure 2:
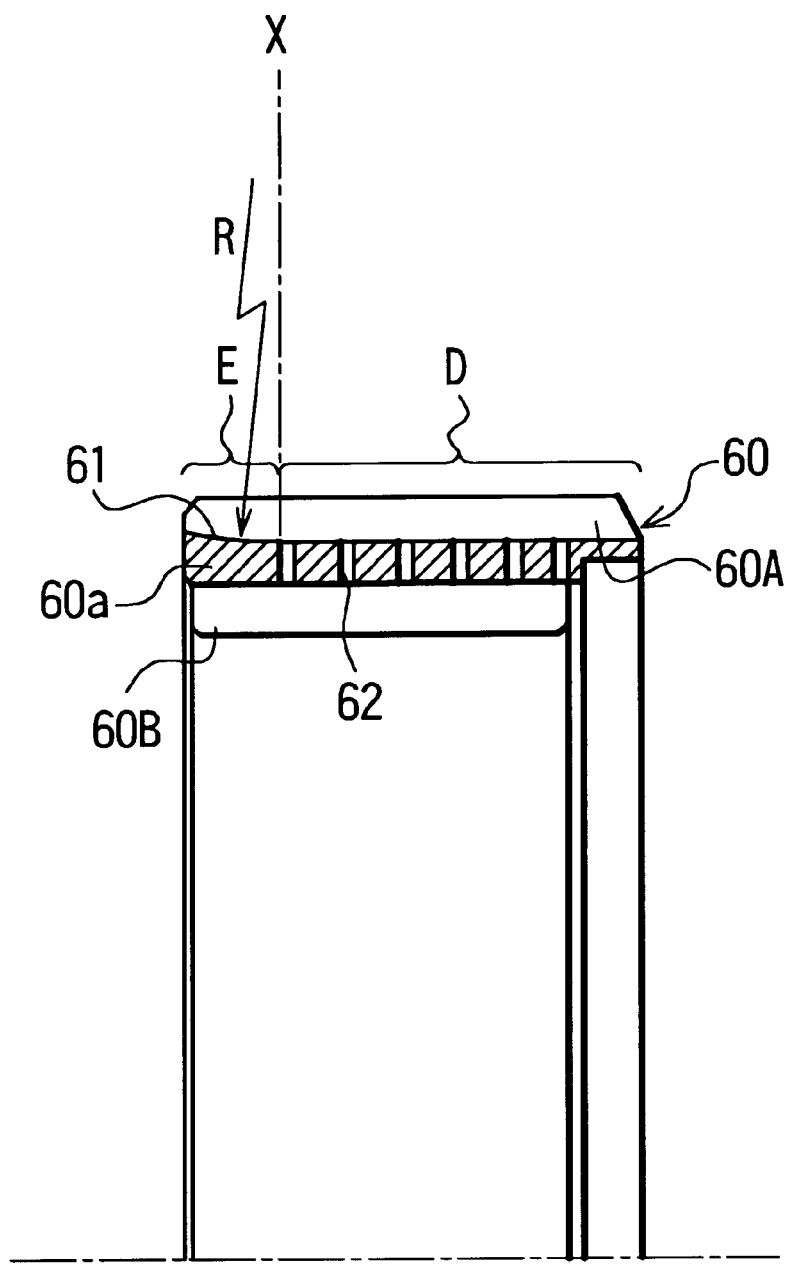
FIG. 2 is a cross sectional view showing one half of a ring gear of one of the planetary gear sets shown in FIG. 1.

FIG. 1 is a vertical cross sectional view showing planetary gear sets of an automatic transmission according to one embodiment of the present invention, and FIG. 2 is a cross sectional view showing one half of a ring gear used in one of the planetary gear sets. More specifically, FIG. 1 shows two planetary gear sets P1, P2, one brake B, and one clutch C, out of a plurality of planetary gear sets, a plurality of clutches and a plurality of brakes that constitute a change-gear mechanism of the automatic transmission.

The brake B shown in FIG. 1 includes a plurality of driven plates 1 that are no-rotation side friction plates, and a plurality of drive plates 2 that are rotation side friction plates. In operation, a suitably controlled frictional force is applied between the respective driven plates 1 and the corresponding drive plates 2, thereby to stop rotation of a brake drum 3 that engages with the drive plates 2.

A spline 4A is formed in an inner surface of a casing 4 of the automatic transmission. On the other hand, a spline 3A that faces the spline 4A is formed on the outer periphery of the brake drum 3 that is rotatable relative to the casing 4. The spline 4A is held in mesh with teeth formed on the outer peripheries of the driven plates 1, and the spline 3A is held in mesh with teeth formed on the inner peripheries of the drive plates 2. The brake drum 3 is rotatably supported by a rotor 5 disposed radially inwardly of the drum 3, via a bearing. This rotor 5 is in turn rotatably supported by an input-side rotary shaft 6 via a bearing.

The planetary gear set P1 includes a sun gear 7, a plurality of pinion gears 8, planet carrier 9 and a ring gear 10. The brake drum 3 indicated above is fixed to the sun gear 7 of the planetary gear set P1 so that the drum 3 is rotated as a unit with the sun gear 7. The sun gear 7 is rotatably supported on the outer periphery of the rotor 5, and is adapted to be rotated as a unit with the brake drum 3. The plurality of pinion gear 8 are respectively supported by the planet carrier 9 such that the pinion gears 8 are freely rotatable relative to the carrier 9. Each of the pinion gears 8 engages with the sun gear 7 and ring gear 10.

The driven plates 1 and drive plates 2 alternately overlap with each other in an annular overlap region. The driven plates 1 are movable along the spline 4A in the axial direction of the automatic transmission, and the drive plates 2 are movable along the spline 3A in the same axial direction. The driven plates 1 and drive plates 2 are sandwiched by and between a retaining plate 11 and a hydraulic piston 12.

The hydraulic piston 12 includes a plurality of pressing portions 12a disposed at substantially equal intervals in the circumferential direction. In operation, this hydraulic piston 12 is moved to the left as viewed in FIG. 1 when a hydraulic pressure is applied to a hydraulic chamber 30a of a cylinder 30 disposed at the right-hand side, inner wall portion of the casing 4. Further, a plurality of return springs 13 are provided for biasing the hydraulic piston 12 to the right as viewed in FIG. 1.

The retaining plate 11 is formed at its outer periphery with teeth that engage with the spline 4A. A snap ring 16 fixed to the spline 4A serves to limit leftward movement of the retaining plate 11 in FIG. 1. When a hydraulic pressure is applied to the hydraulic chamber 30a, the hydraulic piston 12 is moved to the left while compressing the return spring 13. The hydraulic piston 12 cooperates with the retaining plate 11 that abuts on the snap ring 16 to compress overlapping portions of the driven plates 1 and drive plates 2. This compressive force gives rise to frictional force between the planes of the driven plates 1 and drive plates 2, and braking torque is transmitted along a path defined by the spline 4A, driven plates 1, drive plates 2 and spline 3A, to stop rotation of the brake drum 3.

The planet carrier 9 of the above-described planetary gear set P1 is connected to a clutch drum 40 that is one element of the clutch C, and the ring gear 10 of the planetary gear set P1 is connected to a planet carrier 59 of another planetary gear set P2 that is provided in addition to the planetary gear set P1.

The clutch C includes the clutch drum 40, a plurality of driven plates 41, and a plurality of drive plates (friction plates) 42. A spline 40A is formed in the inner surface of the clutch drum 40. On the other hand, a spline 60A that faces the spline 40A is formed on the outer periphery of the ring gear 60 that is rotatable about the axis of the input-side rotary shaft 6 via a hub portion 63. The spline 40A is held in mesh with teeth formed on the outer peripheries of the driven plates 41, and the spline 60A is held in mesh with teeth formed on the inner peripheries of the drive plates 42.

The driven plates 41 and drive plates 42 alternately overlap with each other in an annular overlap region. The driven plates 41 are movable along the spline 40A in the axial direction of the automatic transmission, and the drive plates 42 are movable along the spline 60A in the same axial direction. The driven plates 41 and drive plates 42 are sandwiched between a retaining plate 51 and a hydraulic piston 52.

The hydraulic piston 52 has a pressing portion 52a, and is adapted to be moved to the left in FIG. 1 when a hydraulic pressure is applied to a hydraulic chamber 70a of a cylinder 70 formed in the clutch drum 40. The clutch drum 40 is rotatably supported by a boss portion 50 via a bearing. The hydraulic piston 52 is provided with a return spring 53 for biasing the piston 52 to the right in FIG. 1. The retaining plate 51 is formed at its outer periphery with teeth that engage with the spline 40A. A snap ring 56 fixed to the spline 40A serves to limit leftward movement of the retaining plate 51 as viewed in FIG. 1.

When a hydraulic pressure is applied to the hydraulic chamber 70a, the hydraulic piston 52 is moved to the left in FIG. 1 while compressing the return spring 53. As a result, the pressing portion 52a of the hydraulic piston 52 pushes the driven plates 41 and drive plates 42 to the left through a dish plate 43, and cooperates with the retaining plate 51 that abuts on the snap ring 56 to compress the overlapping portions of the driven plates 41 and drive plates 42. This compressive force gives rise to frictional force between the planes of these driven and drive plates 41, 42, whereby the ring gear 60 of the planetary gear set P2 is rotated as a unit with the clutch drum 40. If the frictional force is released, the ring gear 60 and clutch drum 40 are rotated independently of each other.

The planetary gear set P2 includes a sun gear 57, a plurality of pinion gears 58, planet carrier 59 and ring gear 60. The sun gear 57 engages with the pinion gears 58, and also engages with the input-side rotary shaft 6 such that the sun gear 57 is rotated with the rotary shaft 6. The plurality of pinion gears 58 are respectively supported by the planet carrier 59 such that the pinion gears 58 are freely rotatable relative to the carrier 59. Each of the pinion gears 58 engages with the sun gear 57 and ring gear 60.

As shown in FIG. 2, the ring gear 60 of the planetary gear set P2 is formed at its inner periphery with inner teeth 60B that engage with the plurality of pinion gears 58, and also formed at its outer periphery with a spline 60A. The spline 60A is formed over the entire width of the ring gear, to extend from one axial end of the gear 60 connected to the hub portion 63 to the other axial end. A portion D of the spline 60A that extends from the above one axial end of the ring gear 60 to a given point X between the opposite axial ends is used for engagement with the drive plates 42, and the remaining portion E of the spline 60A that extends from the above-indicated given point X to the other axial end is not used for engagement with the drive plates 42.

Also, the thickness of the ring gear 60 (i.e., thickness of a cylindrical portion 60a of the ring gear 60) in the above-described portion E is made larger than that of the ring gear 60 in the portion D ranging from the above one axial end to the given point X, by increasing the root diameter of the portion E of the spline 60A.

Namely, in the present embodiment, the thickness of the portion E of the ring gear 60 in which the spline 60A is not used for engagement with the drive plates 42 is gradually increased toward the other end in the axial direction of the gear 60, thereby to form a curved portion 61 having a large radius of curvature (R), as shown in FIG. 2.

The cylindrical portion 60a of the ring gear 60 is formed with a plurality of oil paths 62 that communicate with the spline 60A and the inner teeth 60B. The ring gear 60 is connected at one end thereof to the hub portion 63 by welding.

In the present embodiment as described above, the spline 60A is formed over the entire width on the outer periphery of the ring gear 60, such that the portion D of the spline 60 extending from one axial end of the ring gear 60 to a given point X between the axially opposite ends is used for engagement with the drive plates 42 of the clutch C, and the remaining portion E of the spline 60A is not used for engagement with the drive plates 42. Further, the thickness of the portion E of the ring gear 60 is made larger than that of the portion D of the ring gear 60. Therefore, the ring gear 60 is given an increased strength without increasing the outside diameter of the ring gear 60 (namely, outside diameter of the spline 60A). Thus, the strength of the ring gear 60 can be increased without causing an increase in the bearing pressure or stresses on the drive plates 42 of the clutch C and engaging faces of the spline 60A. In addition, the ring gear 60 has a high rigidity since the above-indicated one end of the gear 60 is connected to the hub portion 63 by welding. Thus, the rigidity of the ring gear 60 is made almost uniform in the axial direction, and the ring gear 60 is less likely to be influenced by strains that would otherwise arise due to the centrifugal force during high-speed rotation, assuring improved tooth bearing and reduced gear noises.

In the present embodiment, the portion E of the spline 60A is formed such that the thickness of the ring gear 60 is gradually increased toward the other end in the axial direction of the gear 50, to form the curved portion 61 having a large radius of curvature (R). Accordingly, reduced strains arise in the ring gear 60 during heat treatment in the production process, and therefore the inner teeth 60B of the ring gear 60 can be formed with high accuracy.

Figure 3:
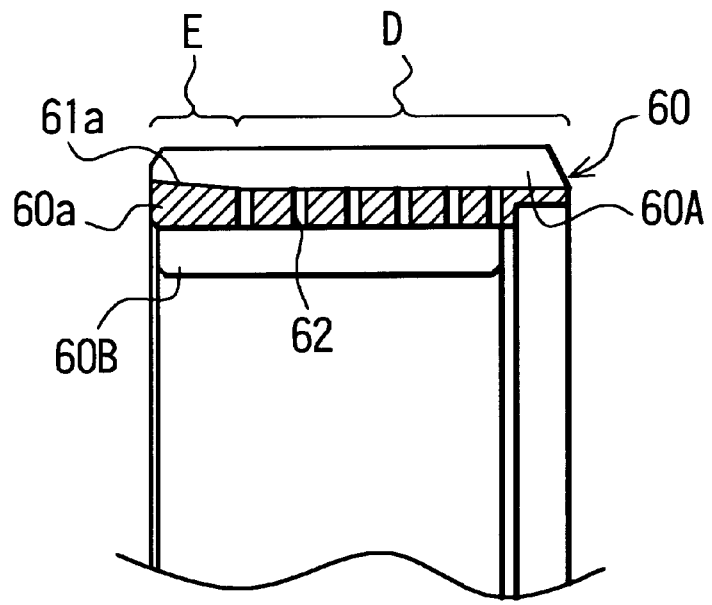
FIG. 3 is a cross sectional view showing a part of a ring gear of a modified example.

FIG. 3 shows a modified example of the embodiment illustrated above. In this example, the thickness of the ring gear 60 having the portion E of the spline 60A that is not used for engagement with the drive plates 42 is gradually increased toward the other end in the axial direction of the ring gear 60, so as to form a tapered portion. The same effects as obtained in the illustrated embodiment can be achieved by this modified example.

Figure 4:
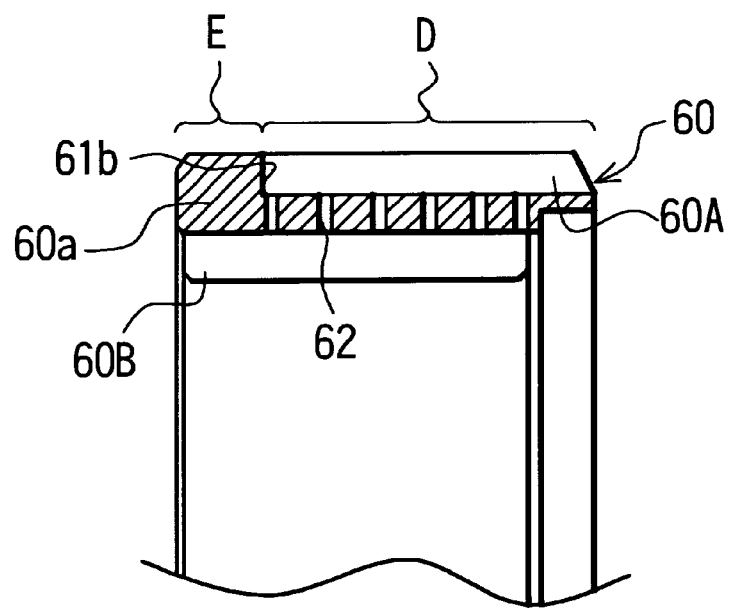
FIG. 4 is a cross sectional view showing a part of a ring gear of another modifier example.

FIG. 4 shows another modified example of the illustrated embodiment. In this example, the spline 60A is formed on the outer periphery of the ring gear 60 over the portion D extending from one axial end of the gear 60 to a given point between its axially opposite ends. Namely, the spline 60A is not formed on the outer periphery of the ring gear 60 over the portion E extending from the given point to the other axial end. Further, the cylindrical portion 60a of the ring gear 60 is formed with a stepped portion 61b at the boundary of the above two portions D, E, and the thickness of the portion E of the ring gear 60 is made larger than that of the portion D of the gear 60.

In this modified example, the thickness of the ring gear 60 can be maximized in the above-indicated range E that is not used for engagement with the drive plates 42, and the strength of the ring gear 60 can be further increased, which is particularly advantageous when heat treatment is not conducted during production of the ring gear 60.

As explained above, according to the present invention, the spline is formed on the outer periphery of the ring gear over a portion that extends from one axial end of the ring gear to a given point between the above-indicated one axial end and the other axial end, such that only this portion of the spline engages with friction plates of a clutch, and the remaining portion of the ring gear that extends from the given point to the other axial end has a larger thickness than the above portion of the ring gear that extends from the above-indicated one axial end to the given point. In this arrangement, the ring gear is given an increased strength without increasing the outside diameter of the ring gear. Accordingly, the strength of the ring gear can be increased without causing an increase in the bearing pressure or stresses on the friction plates of the clutch and engaging faces of the spline.

When the thickness of the portion of the ring gear that extends from the given point to the other axial end is gradually increased toward the other axial end, reduced strains arise in the ring gear during heat treatment in the production process, and thus the inner teeth of the ring gear can be formed with high accuracy.

When the ring gear is provided at one axial end thereof with a hub portion, the rigidity of the ring gear is made almost uniform in the axial direction, and the ring gear is less likely to be influenced by strains that would otherwise arise due to the centrifugal force during high-speed rotation, assuring improved tooth bearing and reduced gear noises.

What is claimed is:

1. A planetary gear device of an automatic transmission, comprising a sun gear, a plurality of pinion gears that engage with the sun gear, a carrier that rotatably supports the pinion gears, a ring gear having inner teeth formed on an inner periphery thereof such that the inner teeth engage with the pinion gears, wherein a spline is formed on an outer periphery of said ring gear over a first portion that extends from one axial end of said ring gear to a point between said one axial end and the other axial end, such that said first portion of said spline engages with friction plates of a clutch, and wherein a second portion of said ring gear that extends from said point to the other axial end has a larger thickness than said first portion of the ring gear that extends from said one axial end to said point.

2. A planetary gear device according to claim 1, wherein the thickness of said second portion of said ring gear that extends from said point to the other axial end is gradually increased toward the other axial end.

3. A planetary gear device according to claim 1, wherein said ring gear is provided at said one axial end thereof with a hub portion.

* * * * *